US005552943A

United States Patent [19]
Hirano et al.

[11] Patent Number: 5,552,943
[45] Date of Patent: Sep. 3, 1996

[54] APPARATUS AND METHOD FOR ACCESSING A LOCATION ON A MAGNETIC TAPE

[75] Inventors: Yoshiaki Hirano; Teruhito Noshiro; Takamoto Shimizu, all of Kanagawa, Japan

[73] Assignee: Sony Corporation, Tokyo, Japan

[21] Appl. No.: 727,444

[22] Filed: Jul. 9, 1991

[30] Foreign Application Priority Data

Jul. 10, 1990 [JP] Japan .................... 2-180607

[51] Int. Cl.$^6$ .......................... G11B 15/18; G11B 15/46
[52] U.S. Cl. .................. 360/69; 360/72.2; 360/72.3; 360/73.01; 360/73.02; 360/73.03
[58] Field of Search .............. 360/69, 71, 72.1, 360/72.2, 72.3, 73.01, 73.02, 73.03, 73.06, 73.08

[56] References Cited

U.S. PATENT DOCUMENTS

| | | | |
|---|---|---|---|
| 3,737,751 | 6/1973 | Lima | 318/463 |
| 3,916,441 | 10/1975 | Jones | 360/71 |
| 4,225,890 | 9/1980 | Takenaka et al. | 360/71 |
| 4,302,784 | 11/1981 | Mussatt | 360/72.1 |
| 4,315,286 | 2/1982 | Copeland | 360/72.1 |
| 5,087,993 | 2/1992 | Kobayashi | 360/71 |
| 5,150,263 | 9/1992 | Sakamoto et al. | 360/69 |

FOREIGN PATENT DOCUMENTS

| | | |
|---|---|---|
| 0176301 | 4/1986 | European Pat. Off. . |
| 2632800 | 12/1989 | France . |
| 2220786 | 1/1990 | United Kingdom . |
| 88/08193 | 10/1988 | WIPO . |

*Primary Examiner*—David C. Nelms
*Assistant Examiner*—Trong Phan
*Attorney, Agent, or Firm*—William S. Frommer; Alvin Sinderbrand

[57] ABSTRACT

Access to a location on a tape along a transportation path thereof is controlled by controlling a revolution velocity of a reel motor based on a distance from a current location of the tape to a preselected location thereon, and in accordance with an estimated deviation in the revolution velocity between an optimum value at which the reel motor ideally should be driven and an actual revolution velocity at which the reel motor is actually driven.

4 Claims, 4 Drawing Sheets

APPARATUS AND METHOD FOR ACCESSING A LOCATION ON A MAGNETIC TAPE

BACKGROUND OF THE INVENTION

This invention relates to an apparatus for accessing a target position on a tape along a transportation path thereof in a tape recorder, and more particularly to a tape location control apparatus for a tape recorder used for determination of head position at the time of editing, etc. using a digital audio tape recorder, or a video tape recorder, etc. for professional use in preparing a master tape.

In recent years, in preparing a master tape for producing optical digital audio discs, compact discs, etc., or digital audio software such as audio tapes, etc., there are many instances where digital recording is carried out. Many processes from the recording process up to the cutting process are digitally carried out. The equipment provided for professional use must provide high accuracy and capabilities. For example, the capability of accessing a desired target position or location at high velocity leads to reduced editing time. This is therefore advantageous from the viewpoint of cost. High velocity access to a preselected location on a tape is carried out by a tape position control, or so called locate control.

In order to implement the tape position control (locate control) an auxiliary track is employed wherein, for example, tape location information is recorded so that by reproduction of the auxiliary track the tape location may be detected. The use of so called control (CTL) track or a so called time code (TC) track, etc., as such an auxiliary track, is known. Further, an approach is also known in which the revolution of a reel table, a tape contact roller, or so called timer roller, etc. is measured to detect the tape location. Known operational modes for carrying out the tape location function using tape location information detected by these methods include a control (CTL) mode making use of a sector address on the control track, a timer mode using a count value of so called a timer roller, a time code (TC) mode using a time code on the tame code track, and the like.

The outline of the configuration of a tape running and driving system including a servo system for tape location control will now be described with reference to FIG. 5.

In FIG. 5, reel sensors 1A and 1B first detect the diameter of a reel of a tape and send the diameter thus detected to a tape running system control unit 2. In addition, FG signals from FG (frequency generation) signal detectors 7A to 7C for respectively detecting the revolutions of reels 5A and 5B, and capstan rollers 6A and 6B, control data or time code data detected at a reproducing magnetic had 8, and a mode switching signal, etc. are delivered to the control unit 2. The tape running system control unit 2 carries out an internal process based on these signals to send a clutch ON/OFF control signal or a FG/CTL servo signal, etc. to a capstan servo circuit 3. Responding to these signals, the capstan servo circuit 3 drives and controls revolution of the capstan rollers 6A and 6B. Further, the tape running system control unit 2 sends, to a reel servo circuit 4, an ON/OFF control signal for the velocity servo, a velocity servo gain adjustment signal, an ON/OFF control signal for the tape position control gain, a tension setting signal, and an indication voltage signal, etc. Thus, the reel servo circuit 4 controls motor drivers 9A and 9B to drive and control revolution of the respective reel motors. In addition, a detected tension value from a tension adjustment unit 10 is fed back to the reel servo circuit 4 and is input thereto.

Further, the reel servo circuit 4 determines a difference between the detected tape current position and a target tape position to be accessed, referred to as an address difference (ADR-DIF) to drive and control the reel motors so that the tape running velocity varies in accordance with a velocity determined in advance in correspondence with the address difference (ADR-DIF) and referred to as a target indication velocity. The above-mentioned target indication velocity (TGV) in this case has a distance-velocity characteristic curve such that, e.g., the tape running velocity has a high value at a position relatively far from the target tape location, the velocity has a lower value as the target position approaches and the tape is stopped at the target location. Thus, the tape is allowed to smoothly approach the target tape location at a high velocity. In this case, the steps of inputting data indicative of the address difference (ADR-DIF) to a predetermined target indication velocity table ROM, etc., reading out a correspondence target indication velocity (TGV-LOC), adding/subtracting an acceleration rate during each predetermined sampling period, e.g., 10 m sec., and thereafter providing a limit at a limit velocity, are carried out by digital signal processing. The output data is treated as an actual indication velocity (CUR-TGV), and is sent through a D/A converter, etc. to an analog servo circuit unit having a velocity servo loop as a minor loop, at which a servo operation is carried out so that any error (velocity deviation) between the actual tape velocity (actual velocity) and the above-mentioned indication velocity data (CUR-TGV) becomes equal to zero.

A locate control curve relating the target indication velocity (TGV-LDC) to the address difference (ADR-DIF)) set in the above-mentioned ROM table, etc. is determined in advance by calculation based on the maximum velocity or the maximum acceleration rate of the reel servo system, etc. In actual terms, a calculation is performed, e.g., on the assumption that the maximum velocity is 16 m/s, and the maximum acceleration rate is about 8 m/s$^2$ in the case of a 10 inch reel and about 3 m/s$^2$ in the case of a 14 inch reel.

Meanwhile, in implementing a tape location control (locate control) as described above, since the loop gain of the velocity servo/tension servo cannot become infinite in reality, the response cannot always follow. For example, in the case of a ramp response, the velocity deviation cannot become zero. Namely, a velocity deviation proportional to the time constant and the acceleration, and inversely proportional to the gain necessarily exists. For this reason, the actual velocity with respect to the indication velocity (CUR-TGV) of the reel servo is increased by the magnitude of the velocity deviation. As the acceleration rate becomes larger, the deviation increases accordingly. Therefore, when, e.g., the case of the 10 inch reel (acceleration rate 8 m/s$^2$) is compared with the case of the 14 inch reel (the acceleration rate 3 m/s$^2$), the velocity deviation of the 10 inch reel is 8/3 times larger than that of the 14 inch real. Even if the operation is performed at the same indication speed, the respective acceleration rates vary by the difference between inertial moments due to the difference in reel diameters.

Further, in the previously described location control technique, since the sampling in the TC mode is more coarse than that in the CTL mode, there occurs a time delay in the TC mode which is about 30 to 42 times larger than that of the CTL mode.

Namely, in the CTL mode, due to the above-described velocity deviation, as shown in FIG. 6, there occurs an error between the curve b representing the target indication velocity data (TGV-LOC) and the curve a representing the indication velocity data (CUR-TGV) for the reel servo. In the TC mode, although the velocity deviation is the same as in the case of the CTL mode, the difference between the curve C representing the target indication velocity data (TGV-LOC) and the curve a representing the indication velocity data (CUR-TGV) in the TC mode is further increased, as shown in FIG. 6 due to the time delay corresponding to the sampling time.

In either mode, because of velocity deviation with respect to the actual velocity and the time delay due to sampling, the acceleration rate of the target indication velocity (TGV-LOC) will become larger than 8 m/s² in the case of the 10 inch reel. As a result, the indication velocity fails to follow.

In the prior art, since it is not recognized that a deviation occurs between the target indication velocity (TGV-LOC) and the indication velocity (CUR-TGV), particularly in the case of the locate control in the TC mode, when an extraordinary state appears such as an unstable operation of the reel servo, the velocity servo gain is severely adjusted to cope with this event. However, such adjustment is difficult, and cannot be sufficiently made for an unstable operation including a different between accelerations for different reel diameters. In the case where an adjustment is not made such that the velocity servo gain falls within the range of ±1 dB, an effect like overshooting results.

SUMMARY OF THE INVENTION

In view of the problems encountered with the conventional tape location control as described above, an object of this invention is to provide a tape location control apparatus for a tape recorder wherein the motion of the tape is controlled so that it is smoothly placed at a target position and is stopped thereat in any mode.

To achieve the above-mentioned object, there is provided an apparatus for controllably accessing a location on a tape along a transportation path thereof by controlling a revolution velocity of a reel motor for driving the tape comprising: means for detecting a current location on the tape, means for generating a signal in accordance with a distance between the current location and a preselected location on the tape, and motor drive means responsive to the signal to control a revolution velocity of the reel motor, wherein the signal is corrected according to an estimated deviation which is a difference between an optimum revolution velocity at which the reel motor should be ideally driven and an actual revolution velocity at which the reel motor is driven by the motor drive means.

In accordance with this invention, an approach is employed to correct a signal generated in accordance with a distance between a current location and a preselected location on the tape in consideration of an estimated deviation which is a difference between an optimum revolution velocity at which the reel motor should be ideally driven and an actual revolution velocity at which the reel motor is driven by the motor drive means. Thus, high accuracy and smooth tape location control operation can be achieved.

DESCRIPTION OF THE PREFERRED EMBODIMENT

A preferred embodiment according to this invention will now be described with reference to the attached drawings.

Figure 1:
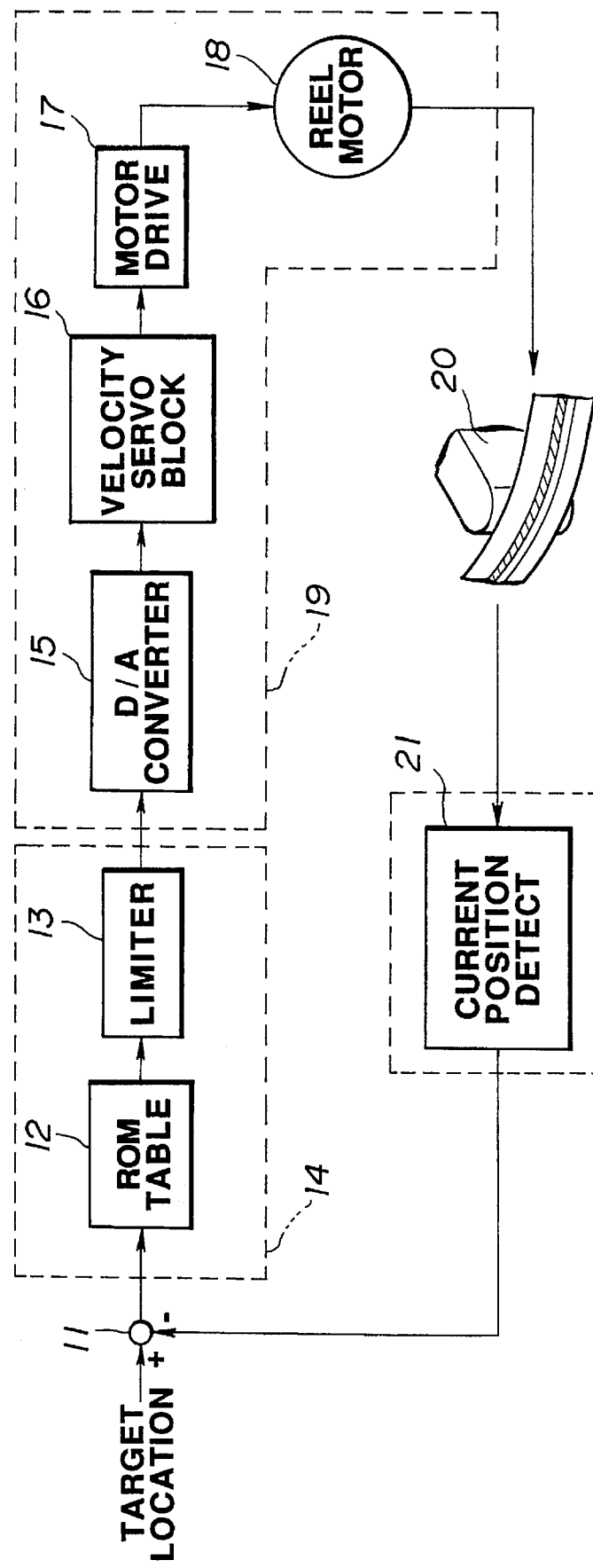
FIG. 1 is a block diagram showing the essential features of an embodiment of a location control apparatus for a tape recorder according to this invention.

FIG. 1 is a block diagram showing the outline of the configuration of a servo system of a location control apparatus for a tape recorder according to an embodiment of this invention.

In FIG. 1, a current tape location and a target tape location are delivered to a subtracter 11, at which a difference therebetween is provided. Namely, to the subtracter 11, a desired target tape location to be accessed for editing work, etc. is input, and current tape location information based on time code data, etc. read by a magnetic head 20 is also input. The subtracter 11 subtracts the current tape location from the target tape Location to determine a positional error, termed an address difference (ADR-DIF), which it provides to a ROM table 12 of a software control unit 14. The ROM table 12 outputs target indication velocity data (TGV-LOC) on the basis of the address difference (ADR-DIF) (the tape location error). In the software control unit 14, an addition/subtraction operation based on an acceleration rate is performed in accordance with data obtained, e.g., every 10 m sec on the basis of target indication velocity data (TGV-LOC) to restrict it to a limited velocity by means of a limiter 13 and thereafter it is output as indication velocity data (CUR-TGV) for reel servo. The indication velocity data (CUR-TGV) output from the software control unit 14 is provided to a hardware control unit 19. The hardware control unit 19 is comprised of a D/A converter 15, a velocity servo block 16, a motor drive circuit 17, and a reel motor 18, etc., thus to constitute a so called velocity servo/tension servo loop. The hardware control unit 19 carries out velocity control such that the tape running velocity corresponds with the output signal (CUR-TGV) from the software control unit 14. Namely, the reel servo is implemented so that an error between the indication velocity data (CUR-TGV) as a target value and an actual tape running velocity becomes equal to zero.

In the embodiment of FIG. 1, the locate control characteristic curve stored in the ROM table 12, particularly the curve indicating the target indication velocity (TGV-LOC) with respect to the address difference (ADR-DIF) is subjected to a corrective operation corresponding to a velocity deviation (a difference between an indication velocity given as a servo target and an actual velocity) in the reel servo system. In actual terms, in the process of calculating the target indication velocity (TGV-LOC) with respect to the address difference (ADR-DIF), an acceleration rate is set by taking velocity deviation into account. For example, in the case of the acceleration rate 8 m/s² in the 10 inch reel, when the tape recorder is in the CTL mode, this acceleration rate is calculated by using a value changed to 6.4 m/s² such that the acceleration rate appearing in an actual tape velocity due to a velocity deviation necessarily occurring at the time of an actual servo operation becomes equal to 8 m/s² even in the worst case.

Further, when the tape recorder is the TC mode, a reel servo mode using the previously described TC (Time Code), since there is the problem of time delay due to sampling coarseness, the case of the CTL mode is taken as a reference to optimize the target indication velocity so that it is adapted for the TC mode, thus to set a curve of the target indication velocity (TGV-LOC) with respect to the address difference (ADR-DIF).

The method of setting such a curve of the target indication velocity (TGV-LOC) with respect to the address difference (ADR-DIF) will now be described with reference to FIG. 2.

Figure 2:
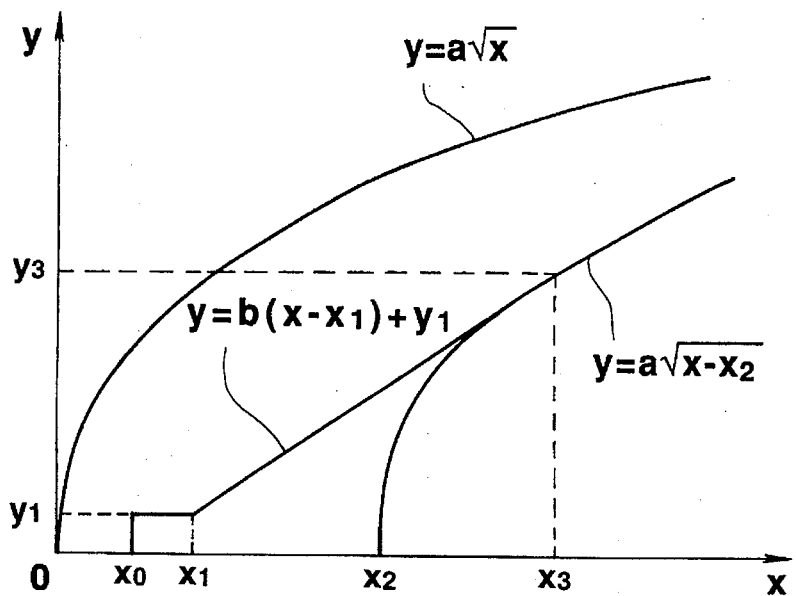
FIG. 2 is a graph showing the curve or a target indication velocity (TGV-LOC) with respect to an address difference.
Figure 6:
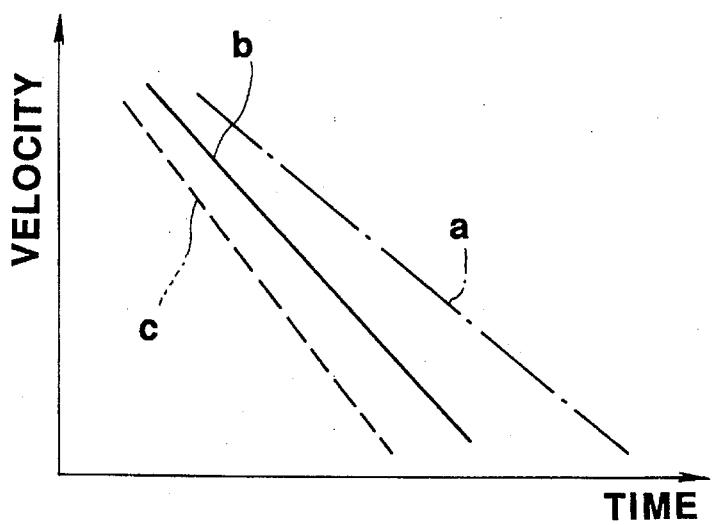
FIG. 6 is a graph showing the relationship between the target indication velocity and the indication velocities for the reel servo in the CTL mode and the TC mode.

In FIG. 2, the target indication velocity (TGV-LOC) is represented as y on the ordinate and the address difference (ADR-DIF) is represented as x on the abscissa, wherein x=0 corresponds to the target address location. At the time of a fixed acceleration rate, the target indication velocity (TGV-LOC) y is expressed as a function of the ½-th power of the address difference (ADR-DIF). In this case, however, setting is made for an actual target value as follows. Namely, a location slightly in front thereof is set as a target value to add a predetermined offset so that the target indication velocity does not overrun the actual target value even if it overruns the set target value. Further, when the address difference falls within a predetermined range, the function indicating the target indication velocity is caused to be in the form of a straight line so as to output a voltage proportional to an address difference.

The tape location or the address difference x at the tame of a fixed acceleration rate∝is expressed as a function of the second power of the time t. By using, as reference, the time when the tape running is stopped, replacement of the time before the tape running is stopped by T gives $$x = \frac{1}{2} \propto T^2$$

In this instance, the velocity y is expressed as follows:

$$\begin{aligned} y &= \propto T \\ &= \sqrt{2} \propto x \\ &= a\sqrt{x} \\ (a &= \sqrt{2} \propto) \end{aligned}$$

Adding a predetermined offset value $X_2$ to the velocity y gives $$y = a\sqrt{x} - x_2$$

However, when the address difference is within $X_3$, the locate operation is performed using the straight line $y=b(x-X_1)+y_1$ tangential to the above-mentioned curve at the point $(x_3, y_3)$, wherein: $b=a\sqrt{x_3-x_2}/x_3$. Further, when the address difference is within $x_1$, the target location velocity y is set at a fixed velocity $y_1$. In addition, when the address difference is within $x_0$, the velocity servo is cut OFF. Here, the address difference $x_0$ is determined in dependence upon the locate accuracy. In the case where, e.g., a locate accuracy of ±16 sectors is required for the target value, $x_0$ is set to 16 sectors. Further, the velocity $y_1$ is set to a value to fall to zero within ±16 sectors with respect to the target value even in the case where when a drive voltage corresponding to the velocity y is larger than the minimum drive voltage of the reel, and the address difference falls within 16 sectors with respect to the target value, the velocity servo is cut OFF, and the tape running is caused to be stopped only by a mechanical loss (mechanical load).

In this embodiment, in calculating the above-described respective offset values $x_1$, $x_2$, and $x_3$, an acceleration rate modified in consideration of the above-mentioned velocity deviation is used. In actual terms, with respect to the acceleration rate 8 m/s² in the case of the 10 inch reel and the acceleration rate 3 m/s² in the case of the 14 inch reel, 6.4 m/s² and 2.7 m/s² are used at the time of the CTL mode, respectively. In addition, at the time of the TC mode, 7.2 m/s² and 2.7 m/s² are respectively used to determine the respective offset values, particularly the above-mentioned $x_2$ and $x_3$.

Figure 3:
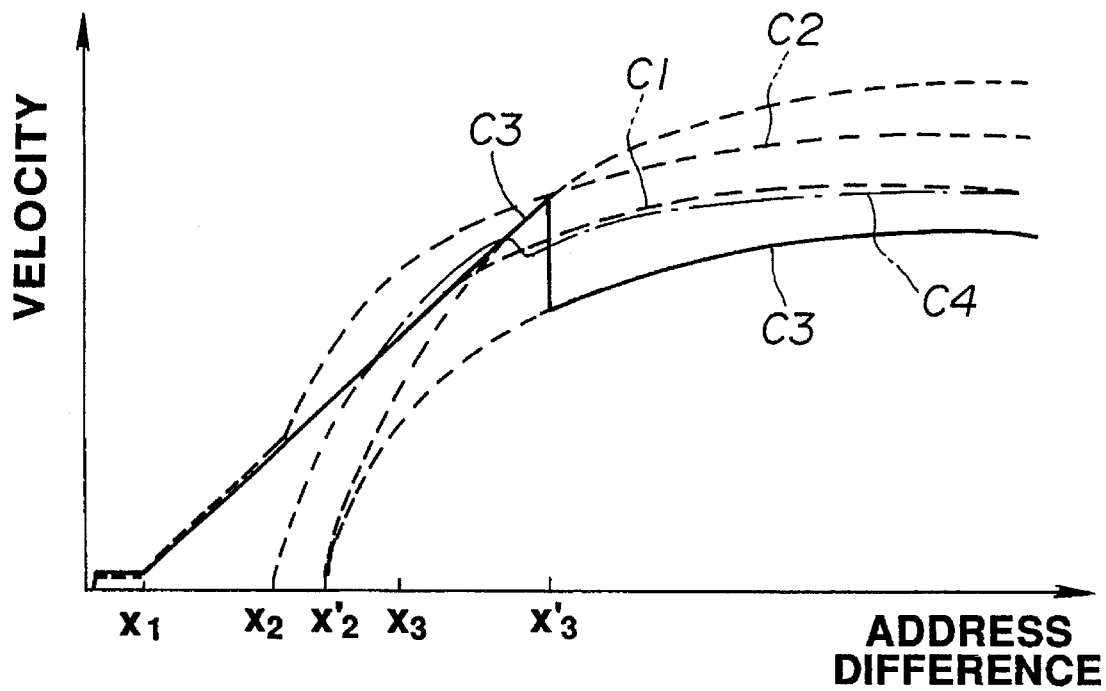
FIG. 3 is a graph showing an actual example of a corrected locate control characteristic curve in the TC mode.

FIG. 3 shows an actual example of the corrected locate control characteristic curve in connection with the TC mode. Namely, in the case where the TC mode is selected as the tape location control, the ROM table 12 outputs a target location velocity (TGV-LOC) in accordance with a characteristic curve illustrated in FIG. 3 in dependence upon the input address difference (ADR-DIF).

In FIG. 3, in the case of the 10 inch reel, a theoretical acceleration rate in which a velocity deviation quantity of the target indication velocity (TGV-LOC) is taken into account is set to 6.4 m/s². In the CTL mode, this curve is used at values theoretically expected. In the TC mode, a curve obtained by further optimizing the above-mentioned curve is used. Namely, the target location velocity (TGV-LOC) C1 written in the ROM table 12 employs a velocity curve calculated by using the acceleration rate 6.4 m/s² in the range larger than $x_3$, and employs a straight line in the range from the address $x_3$ to $x_1$. It is indicated in FIG. 3 that the location velocity C2 (CUR-TGV; NORM) for an actual reel servo with respect to the target location velocity Cl (NORM) written in the ROM table varies due to velocity deviation with respect to the target location velocity until the address difference $x_2$. Here, in the CTL mode, location control could be conducted by using a characteristic curve as expected by design so that a smooth deceleration curve is provided. However, in the TC mode, a velocity expected by design cannot be provided simply by using a correction, In view of this, the curve C3 of FIG. 3 which is the target indication velocity further optimized will now be described.

When in the TC mode, with 6.4 m/s² as the theoretical acceleration rate of the target indication velocity (TGV-LOC), a substantial acceleration rate is 7.2 m/s² when the deviation of the velocity servo gain is 0 dB.

FIG. 3 illustrates the relationship of the actual indication velocity (CUR-TGV) expressed as the curve C2 (NORM) with respect to the curve C1 (NORM) of the theoretical target indication velocity (TGV-LOC). Accordingly, by taking into consideration the above-mentioned relationship, a portion of the quadratic curve of the characteristic curve C1 is withdrawn to the points $x_2'$ and $x_3'$ on the curve when the acceleration rate is 7.2 m/s₂. By carrying out such an adjustment, the actual indication velocity (CUR-TGV) is instead expressed by the curve C4 (ADJUST) with respect to the adjusted curve C3 (ADJUST) of the theoretical target indication velocity (TGV-LOC). Thus, as compared to the curve C2, the tape running is decelerated in accordance with a velocity proportional to an address difference sufficiently in front of the target position.

Figure 4:
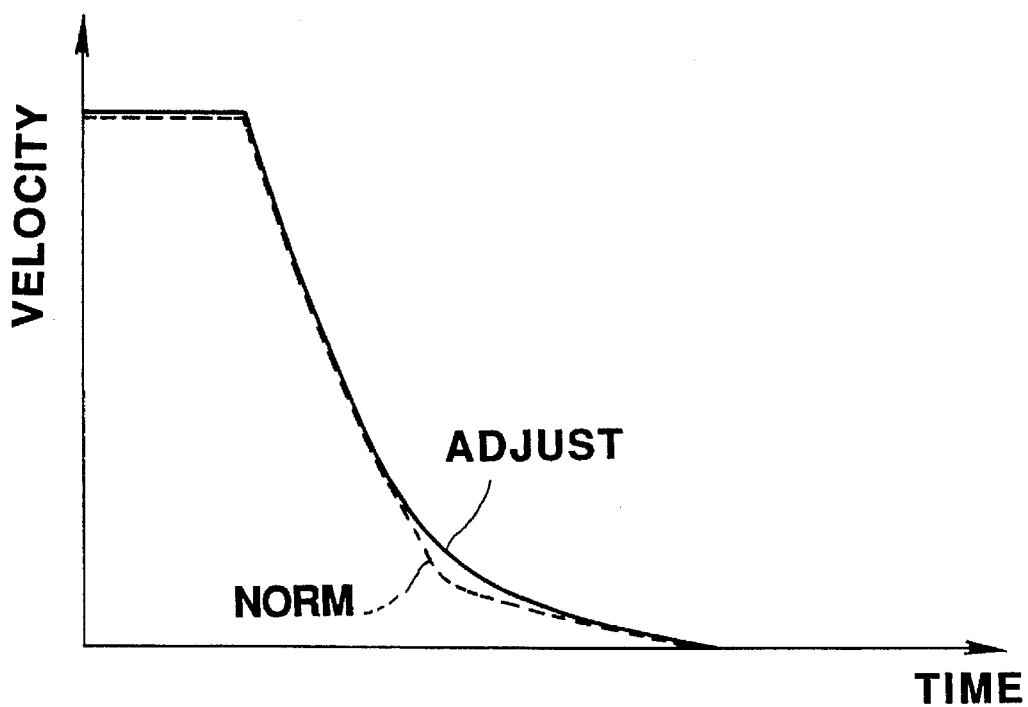
FIG. 4 is a graph showing a difference between an actual indication velocity curve C2 (NORM) and a curve C4 (ADJUST) in accordance with a relationship between the actual velocity and time.
Figure 5:
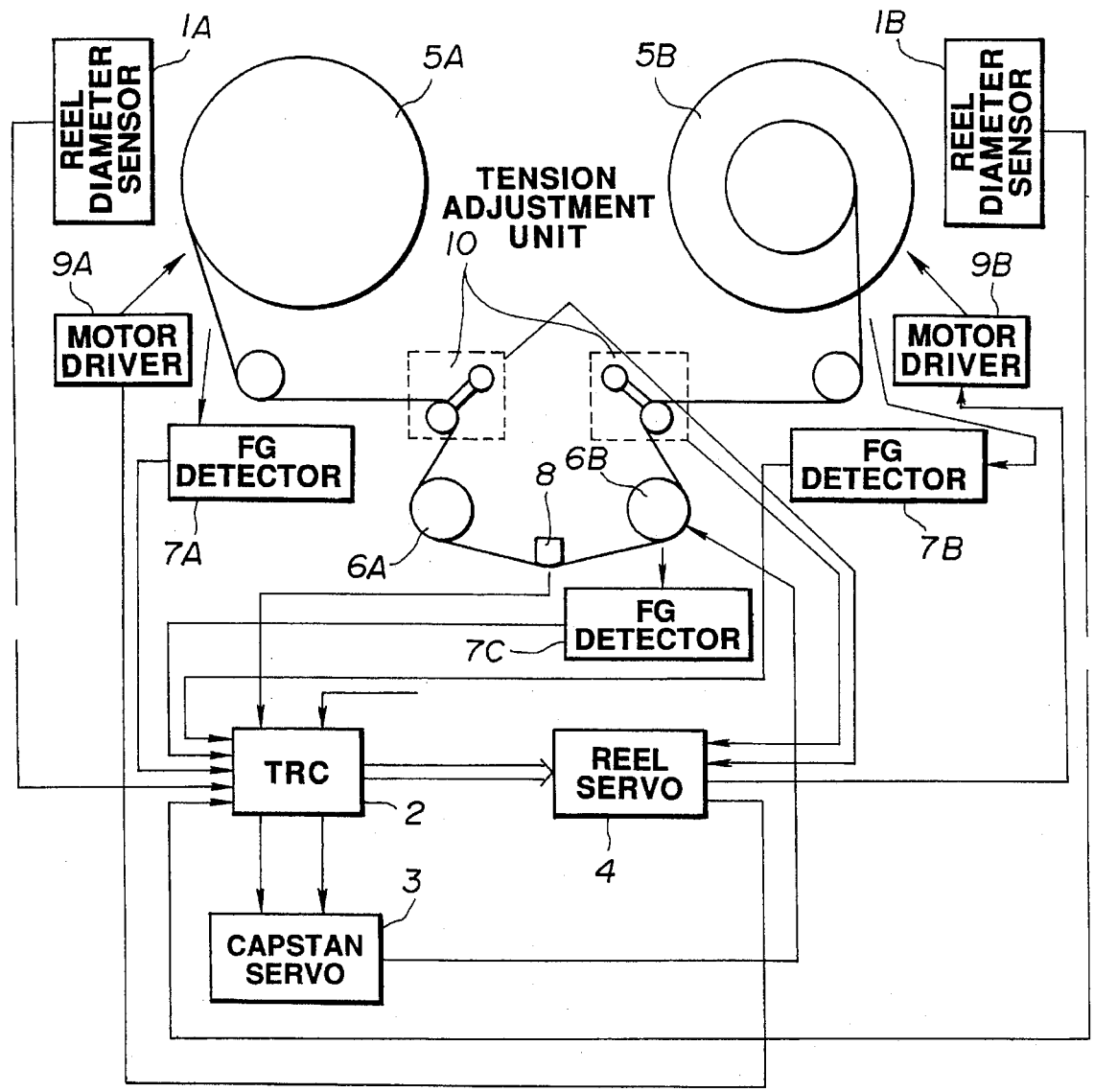
FIG. 5 is a block diagram showing an outline of the configuration of the tape running and driving system including a servo system for tape location control.

By depicting, in model form, a difference between the curve C2 (NORM) and the curve C4 (ADJUST) representing the actual indication velocity (CUR-TGV) expressed as the actual velocity with respect to time, the curve as shown in FIG. 4 is provided. From FIG. 4, it will be seen that the curve C4 (ADJUST) is smoothly subjected to velocity control with the lapse of time. On the other hand, the curve C2 reveals a time delay in a portion of the velocity control as compared with the curve C4.

In accordance with an actual measurement result, when the deviation of the velocity servo gain is 0 dB, there exists substantially no difference between both curves. However, when the deviation of the velocity servo gain is −3 dB, there exists a relatively large difference therebetween, and the effect thereof is apparent in operation as well.

Further, as previously described, since even if an operation is conducted at the same indication speed, and respective acceleration rates vary with the inertial moments due to variations in reel diameters, in the case of the 14 inch reel in the TC mode, the value of the theoretical acceleration rate was set at 2.7 m/s$^2$.

In this case, since there is hardly a deviation of an actual velocity (F/V OUT) with respect to (CUR-TGV) of an actual indication velocity at the time of about −3 dB, less deviation of the servo gain results.

The relationship between the deviation of the velocity servo gain at the set acceleration rate and an actual acceleration rate with respect to the characteristic curve of the locate control was obtained as shown in the following Table 1.

TABLE 1

| Deviation of the Velocity Servo Gain | Actually Measured Acceleration Rate (m/s) | |
|---|---|---|
| (dB) | 10 inches | 14 inches |
| −3 | 7.22 | 2.79 |
| 0 | 7.08 | 2.75 |

As shown in the above Table 1, at −3 dB, in the case of the 10 inch reel, the actually measured acceleration rate is 7.22 m/s$^2$ while the set acceleration rate is 6.4 m/s$^2$, and in the case of the 14 inch reel, the actually measured acceleration rate is 2.79 m/s$^2$ while the set acceleration rate is 2.7 m/s$^2$. As seen from this, there is substantially no difference between the set value and an actually measured acceleration rate with the deviation of the velocity servo gain. In the location control of the 14 inch reel, since switching to the gain for the locate control is made at the characteristic curve portion of the adjusted theoretical locate control, when the address difference is more than 1024 sectors, the velocity servo gain is two times larger than that in the case of the 10 inch reel. Further, it is seen from the above Table that the actually measured acceleration rate of the 14 inch reel is about 2.5 to 3 times smaller than the actually measured acceleration rate of the 10 inch reel. As previously described, since the velocity deviation is proportional to the acceleration and the time constant of the system and inversely proportional to the velocity servo gain, when the time constant of the system is subsequently constant, in the case of the 14 inch reel, e.g., an actual velocity deviation is represented as (1/2.5)×(1.2)=(⅕) that of the 10 inch reel by calculation. Accordingly, it is considered that the velocity deviation of the 14 inch reel is in a range of one fifth to one sixth of the velocity deviation of the 10 inch reel. Thus, there results substantially no deviation of the actual velocity (F/V OUT) with respect to the indication velocity (CUR-TGV) for the reel servo.

Hitherto, in the case of the location control in the TC mode, when an extraordinary state such as an unstable operation appears in the reel servo, the deviation of the velocity servo gain was severely adjusted to cope with such an extraordinary state. However, this adjustment was difficult to make, and the adjustment was not sufficiently implemented for different reel diameters in view of the differences in their rates or acceleration. Unless the adjustment is made so that the velocity servo gain is in the range of ±1 dB, undesired effects like overshooting result. However, By carrying out the locate control by the above-described method, it is possible to conduct a locate control for a tape recorder such that the tape is transported smoothly to the target position and stopped thereat, and such that the cost for making the adjustment is reduced.

It is to be noted that this invention is not limited to the above-described embodiment, but an approach may be employed which merely increases/decreases the ratio of the target indication velocity (TGV-LOC) with respect to the address difference (ADR-DIF), thus making it possible to attain effects and/or advantages similar to the above.

In this invention, by controlling the revolution of the tape driving reel motor in accordance with the location information in a tape transport direction by using the above-described method, in either mode, deviation from a theoretical value due to the velocity deviation necessarily occurring at the time of an actual servo operation is canceled. Thus, the transportation of the tape is controlled so that the tape is smoothly positioned at a target location and is stopped thereat.

What is claimed:

1. An apparatus for accessing a preselected location on a tape along a transportation path thereof, said tape being transported through actuation of a reel motor, said apparatus comprising:

location detecting means for detecting a current location on said tape along said transportation path, motor drive means for controlling a revolution velocity of said reel motor in response to a control signal corresponding with an indication revolution velocity curve for said reel motor representing instantaneous revolution velocities thereof, and control signal producing means for producing said control signal based on a distance between said current location and said preselected location on said tape, said control signal producing means being operative to produce said control signal for at least some predetermined distances with respect to said preselected location such that said control signal is selected to compensate for estimated deviations between reel velocities represented by the indication revolution velocity curve corresponding with said control signal and actual reel velocities produced by said motor drive means in response to said control signal such that the actual reel velocities conform to a predetermined velocity profile adapted for accessing said preselected location on the tape, wherein said control signal producing means is operative to produce said control signal such that the indication revolution velocity curve is determined for said at least some predetermined distances with respect to said preselected location in accordance with the following relationships:

$$y = a\sqrt{x - x2} \quad \text{when } x \geq x3$$

$$y = b(x - x1) + y1 \quad \text{when } x1 \leq x < x3$$

-continued $$y = y1 \text{ when } x0 \leq x < x1$$

$$y = 0 \text{ when } x < x0$$

$$a = \sqrt{2\alpha}$$

$$b = a\sqrt{x3 - x2} \ /x3$$

where x represents values of said at least some predetermined distances with respect to said preselected location, y represents values of said indication revolution velocity curve determined at corresponding distances x, x0 is a required accuracy in accessing said preselected location, α is a nominal acceleration of said reel motor selected on the basis of said estimated deviations between reel velocities represented by the indication revolution velocity curve and said actual reel velocities, and x1, x2 and x3 are predetermined values of x and y1 is a predetermined value of y determined on the basis of the nominal acceleration α.

2. An apparatus for accessing a preselected location on a tape along a transportation path thereof, said tape being transported through actuation of a reel motor, said apparatus comprising:

location detecting means for detecting a current location on said tape along said transportation path based on a reference signal selected from one of a control signal recorded on a control track of said tape, a time-code recorded on said tape and a count signal generated by a timer roller of said apparatus, motor drive means for controlling a revolution velocity of said reel motor in response to a control signal corresponding with an indication revolution velocity curve for said reel motor representing instantaneous revolution velocities thereof, and control signal producing means for producing said control signal based on a distance between said current location and said preselected location on said tape, said control signal producing means being operative to produce said control signal for said at least some predetermined distances with respect to said preselected location based upon estimated deviations in an actual revolution velocity of said reel motor from reel velocities represented by said indication revolution velocity curve caused by a delay in the detection of said current location by said location detecting means based on said reference signal such that the actual reel velocities conform to a predetermined velocity profile adapted for accessing said preselected location on the tape.

3. A method for accessing a preselected location on a tape along a transportation path thereof, said tape being transported through actuation of a reel motor, comprising the steps of:

detecting a current location on said tape along said transportation path;

controlling a revolution velocity of said reel motor in response to a control signal corresponding with an indication revolution velocity curve for said reel motor representing instantaneous revolution velocities thereof; and producing said control signal based on distances between said current location and said preselected location on said tape, said control signal being produced for at least some predetermined distances with respect to said preselected location such that said control signal is selected to compensate for estimated deviations between reel velocities represented by the indication revolution velocity curve and actual reel velocities produced by said motor drive means in response to said control signal such that the actual reel velocities conform to a predetermined velocity profile adapted for accessing said preselected location on the tape, said control signal being produced such that the indication revolution velocity curve is determined for said at least some predetermined distances with respect to said preselected location in accordance with the following relationships:

$$y = a\sqrt{x - x2} \text{ when } x \geq x3$$

$$y = b(x - x1) + y1 \text{ when } x1 \leq x < x3$$

$$y = y1 \text{ when } x0 \leq x < x1$$

$$y = 0 \text{ when } x < x0$$

$$a = \sqrt{2\alpha}$$

$$b = a\sqrt{x3 - x2} \ /x3$$

where x represents values of said at least some predetermined distances with respect to said preselected location, y represents values of said indication revolution velocity curve determined at corresponding distances x, x0 is a required accuracy in accessing said preselected location, α is a nominal acceleration of said reel motor selected on the basis of said estimated deviations between reel velocities represented by the indication revolution velocity curve and said actual reel velocities and x1, x2 and x3 are predetermined values of x and y1 is a predetermined value of y determined on the basis of the nominal acceleration α.

4. A method for accessing a preselected location on a tape along a transportation path thereof, said tape being transported through actuation of a reel motor, comprising the steps of:

detecting a current location on said tape along said transportation path based on a reference signal reproduced from the tape;

controlling a revolution velocity of said reel motor in response to a control signal corresponding with an indication revolution velocity curve for said reel motor representing instantaneous revolution velocities thereof; and producing said control signal based on distances between said current location and said preselected location on said tape, said control signal being produced for distances relatively near said preselected location based upon an estimated deviation in the revolution velocity of said reel motor from said corresponding instantaneous revolution velocity represented by said control signal caused by a delay in the detection of said current location based on said reference signal such that the actual reel velocities conform to a predetermined velocity profile adapted for accessing said preselected location on the tape.

* * * * *